United States Patent [19]

Sano et al.

[11] 4,046,843
[45] Sept. 6, 1977

[54] PROCESS FOR PREPARING MEMBRANES FOR SEPARATION OF SUBSTANCES

[75] Inventors: Takezo Sano, Takatsuki; Takatoshi Shimomura, Toyonaka; Masao Sasaki, Osaka, all of Japan

[73] Assignee: Sumitomo Chemical Company, Limited, Osaka, Japan

[21] Appl. No.: 606,005

[22] Filed: Aug. 20, 1975

[30] Foreign Application Priority Data

Sept. 5, 1974 Japan .................. 49-102806

[51] Int. Cl.² .............................. B29H 7/20
[52] U.S. Cl. .................. 264/22; 204/159.14; 204/159.16; 210/500 M; 260/2.5 M; 264/49; 264/83; 264/85; 264/331; 264/344; 264/347
[58] Field of Search ............ 264/41, 49, 83, 85, 264/22, 204, 207, 344, 331, 347; 260/2.5 M; 204/159.14, 159.16; 210/500 M

[56] References Cited

U.S. PATENT DOCUMENTS

| 3,133,132 | 5/1964 | Loeb et al. ............... 264/207 |
| 3,376,238 | 4/1968 | Gregorian et al. ......... 264/49 |
| 3,536,796 | 10/1970 | Rock .................. 264/344 |
| 3,542,908 | 11/1970 | Sharples et al. ......... 264/49 |
| 3,544,358 | 12/1970 | Manjikian ............. 264/41 |
| 3,576,686 | 4/1971 | Schmidle et al. ........ 260/2.5 M |
| 3,763,055 | 10/1973 | White et al. ........... 264/49 |
| 3,772,072 | 11/1973 | Brown et al. ........... 264/49 |
| 3,822,330 | 7/1974 | Muir et al. ............ 264/49 |
| 3,864,289 | 2/1975 | Rendall ............... 264/41 |
| 3,880,763 | 4/1975 | Chapman et al. ........ 264/49 |

FOREIGN PATENT DOCUMENTS

| 2,243,222 | 9/1974 | France |
| 74-11487 | 9/1974 | Netherlands |

OTHER PUBLICATIONS

Yasuda et al., "Prep. of R. O. Membrane by Plasma Polymerization of Organic Compounds," *J. of Appl. Science*, vol. 17, pp. 201–222, (1973).

*Primary Examiner*—Jeffery R. Thurlow
*Attorney, Agent, or Firm*—Stevens, Davis, Miller & Mosher

[57] ABSTRACT

A semipermeable membrane is obtained by casting a cast solution comprising a mixture of a water-insoluble high polymer and a water-soluble high polymer, a mixture of a water-insoluble high polymer and a water-soluble surfactant or a mixture of a water-insoluble high polymer, a water-soluble high polymer and a water-soluble surfactant to form a shaped article, exposing the thus formed shaped article to a plasma to crosslink the surface thereof, and then washing the exposed article with water to remove uncrosslinked water-soluble high polymer or water-soluble surfactant. The membrane can be used for such substance separation methods as reverse osmosis, ultrafiltration and the like.

24 Claims, 1 Drawing Figure

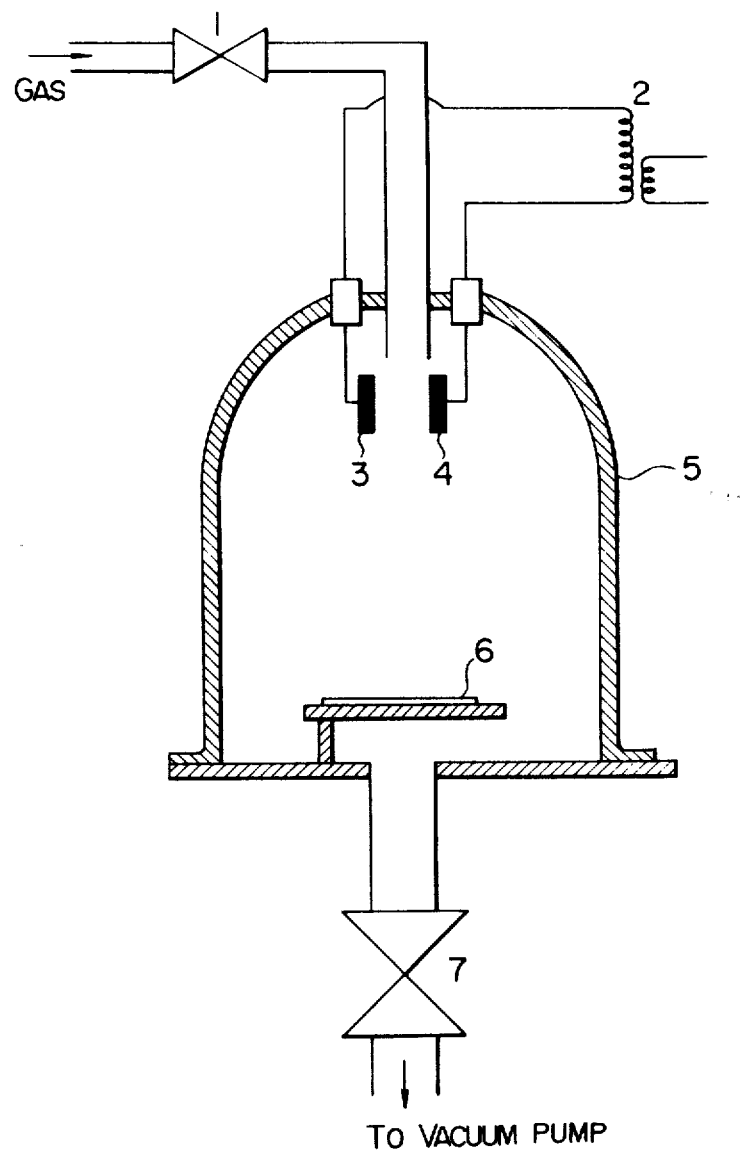

PROCESS FOR PREPARING MEMBRANES FOR SEPARATION OF SUBSTANCES

This invention relates to a process for preparing a semipermeable membrane by crosslinking with a plasma the surface of a shaped article comprising a mixture of a water-insoluble high polymer and a water-soluble high polymer and/or a water-soluble surfactant. The resulting membrane can be used for separation and concentration of substances according to reverse osmosis, ultrafiltration and the like methods.

The semipermeable membrane currently being commercialized is a cellulose acetate membrane produced according to the Loeb and Souriaranjan method (U.S. Pat. Nos. 3,133,132 and 3,133,137) or a similar method. In spite of its good performances regarding the flux of water and the rejection of salt, however, the said cellulose acetate membrane is undesirably limited in life for such reasons that it is deteriorated in quality due to susceptibility of cellulose acetate to hydrolysis or is made higher in density due to high pressure applied thereto with the result that the salt rejection or the flux of permeated water is decreased with lapse of time.

In order to overcome the above-mentioned disadvantages of the conventional cellulose acetate membrane and to prepare membranes that are much higher in water permeability, many attempts have been made to develop reverse osmosis membranes utilizing ultrathin membranes. For example, a cellulose acetate membrane of less than 1 micron has been prepared according to a casting method using as the substrate a porous filter of cellulose ester or polysulfone. So far as cellulose acetate is used as the membrane material, however, such disadvantages of the resulting membrane as susceptibility to hydrolysis and the like cannot be neglected.

On the other hand, a large number of methods using a plasma have been known for preparation of ultrathin membranes of synthetic high polymers. For example a reverse osmosis membrane has been obtained by polymerizing an organic monomer onto a suitable substrate [H. Yasuda et al.: J. Appl. Polymer Sci., 17, 201-222 (1973)]. It is said, however, that according to this method, the membrane must be formed on a porous substrate having a mean pore diameter of 0.025 micron or less, in view of the process for formation of the membrane.

Since an ultrathin membrane itself is low in mechanical strength, it has been a required condition for the conventional method for preparing an ultrathin membrane that the membrane should be reinforced by forming it on a suitable porous substrate. However, it is difficult to prepare a porous substrate which is sufficiently small in pore diameter so as to support the ultrathin membrane and is sufficiently high in pore density so as to attain high water permeability. Furthermore, the so-called compounding technique of forming a ultrathin membrane on a porous substrate is a technique of extremely high level and is complex because of the adhesion or affinity between the ultrathin membrane and the porous substrate. Thus, the conventional methods for preparing ultrathin membranes have had various disadvantages.

With an aim to overcome the above-mentioned disadvantages of the conventional methods for preparing ultrathin membranes, the present inventors conducted extensive studies to develop an epoch-making and novel membrane-preparing process in which a porous substrate and an ultrathin membrane are produced simultaneously An object of the present invention is to provide a process for preparing a water-insoluble membrane having selective permeability for substances which comprises crosslinking with a plasma only the surface of a shaped article comprising a water-insoluble high polymer, a water-soluble high polymer and/or a water-soluble surfactant.

Another object of the invention is to provide the above-mentioned membrane.

Other objects and advantages of the invention will become apparent from the following description.

According to the process of the present invention, a membrane for separation of substances is obtained by casting a cast solution comprising a mixture of a water-insoluble high polymer and a water-soluble high polymer, a mixture of a water-insoluble high polymer and a water-soluble surfactant or a mixture of a water-insoluble high polymer, a water-soluble high polymer and a water-soluble surfactant to form a shaped article, exposing the thus formed shaped article to a plasma to crosslink the surface thereof, and then washing the exposed article with water to remove uncrosslinked water-soluble high polymer and water-soluble surfactant.

That is, the process of the present invention is entirely different from the conventional process, in which a high polymer solution is cast or plasmapolymerized on a porous substrate to form a membrane. What is more surprising is the fact that when used in reverse osmosis, the membrane prepared by the process of the present invention has the ability to sufficiently separate water and salt from each other and is well comparable in said ability to a cellulose acetate membrane.

The accompanying drawing is a schematic diagram of a plasma irradiating apparatus for use in the process of the present invention.

In the drawing, 1 and 7 are valves, 2 a neon transformer, 3 and 4 electrodes, 5 a vessel, and 6 a sample.

According to the process of the present invention, it is possible to produce a novel synthetic high polymer membrane not susceptible to such deterioration due to hydrolysis of attack of bacteria which deterioration is the disadvantage of the conventional cellulose acetate membrane. Thus, the present invention can provide a membrane utilizable for separation and concentration of substances by reverse osmosis, ultrafiltration or the like which is more excellent in properties than the cellulose acetate membrane of Loeb.

The shaped articles comprising a water-insoluble high polymer, a water-soluble high polymer and/or a water-soluble surfactant which are used in the process of the present invention may be in various forms, in practice, and particularly preferred forms are film, sheet, filament and tube. These articles are made into crosslinked membranes by exposure to a plasma, and then put into practical use as modules of suitable forms. For example, a cast solution comprising a water-insoluble high polymer, a water-soluble high polymer and/or a water-soluble surfactant and a co-solvent therefor is cast on a glass plate or the like, and the resulting membrane is exposed to a plasma to crosslink only the surface thereof and may then be used as a flat or spiral-wound module. On the other hand, a membrane obtained by casting the said cast solution on such substrate as a tubular or rod-shaped glass may be used as an inner or outer pressure type tubular module. Further, a hollow fiber membrane can be obtained by spinning a hollow filament from the above-mentioned cast solution, and a hollow fiber membrane reinforced with a filament can be obtained by immersing a filamentary fiber in the cast solution, followed by drying.

The gases to be used in the present invention to generate the plasma include helium, argon, nitrogen, hydrogen, oxygen, carbon monoxide, carbon dioxide, ammonia, hydrocarbons having 1 to 10 carbon atoms such as, for example, methane, ethane, propane, ethylene, propylene and acetylene, epoxides having 2 to 10 carbon atoms such as, for example, ethylene oxide, propylene oxide and isobutylene oxide, alkylamines such as, for example, dimethylamine and triethylamine, and mixtures of these substances. Particularly when helium, hydrogen or ethylene oxide is used as the plasma-forming gas, a membrane similar in characteristic properties to that prepared by use of other gas can be obtained with a higher crosslinking rate and in a shorter plasma irradiation time than in the case where said other gas is used. The plasma irradiation time adopted in the present invention is usually from 1 to 180 minutes.

The precise chemical mechanism by which the plasma irradiation causes chemical reaction in high polymers has not been elucidated yet. However, in view of such phenomenological fact that in the case of the present invention, the water-soluble high polymer or surfactant present on the surface of cast film has been crosslinked without losing its hydrophilic property and the resulting membrane is sufficiently high in strength, it is considered that the mutual crosslinking of the water-soluble high polymer or surfactant with the water-insoluble polymer which becomes the support, has also taken place.

The plasma referred to in the present invention means a plasma formed by glow discharge, corona discharge or the like.

The plasma for use in the present invention may be generated by various means. A plasma by glow discharge, for example, may be generated, as shown in the drawing, by introducing a plasma-forming gas through a valve 1 into a vacuum vessel 5 so that the pressure inside the vessel 5 becomes 0.01 to 10 Torr., and then impressing between the electrodes 3 and 4 an alternating or direct current voltage of 0.5 to 50 KV by means of a neon transformer 2. Alternatively, a plasma may be formed by generating corona discharge at atmospheric pressure under a direct current of 0.5 to 5 KV. This procedure is more convenient commercial production of the membrane.

Examples of the water-insoluble polymer used in the present invention are polysulfone, polyamide, polyester, polyphenylene oxide, polyacrylonitrile, polymethyl methacrylate, polyvinyl chloride, polystyrene, polyacetal, cellulose acetate and cellulose nitrate. Particularly preferable among these are polysulfone and polyacrylonitrile which are high in chemical stability and low in creep.

Examples of the water-soluble high polymer used in admixture with the water-insoluble high polymer are polyethylene oxide, polyethylene glycol, polyvinylamine, polyacrylamide, polyacrylic acid, polyvinyl pyrrolidone, polyvinyl alcohol and polyethyleneimine. Particularly, polyethylene oxide, polyethylene glycol, polyvinylamine and polyacrylamide give excellent membranes.

Examples of the water-soluble surfactant used in admixture with the water-soluble high polymer are sodium oleate, sodium laurylsulfate, sodium polyoxyethylene alkyl sulfate and the like anionic surfactant; polyoxyethylene lauryl ether, polyoxyethylene cetyl ether, polyoxyethylene oleyl ether, polyoxyethylene nonylphenyl ether, polyoxyethylene stearyl ether, polyoxyethylene octylphenyl ether, polyoxyethylene sorbitan monolaurate, polyethylene glycol monostearate and the like nonionic surfactant; laurylamine acetate, lauryltrimethyl ammonium chloride and the like cationic surfactant; saponin and the like natural surfactant; and other water-soluble surfactants. Among these, polyoxyethylene cetyl ether, polyoxyethylene oleyl ether, polyoxyethylene nonylphenyl ether and polyethylene glycol monosterate are particularly preferred.

The above-mentioned water-soluble polymer or surfactant, or a mixture of the two, is mixed in a proportion of 0.1 to 3 parts, preferably 0.3 to 2 parts, by weight with 1 part by weight of the water-soluble high polymer, whereby a desired membrane can be obtained.

As stated above, one of the characteristic features of the present process for preparing a membrane resides in that a thin film formed by casting a cast solution comprising a water-insoluble high polymer, a water-soluble high polymer and/or a water-soluble surfactant is exposed to a plasma to produce a porous substrate and a membrane at one state. According to the process of the present invention, therefore, no support is required to be prepared and it is not necessary to adopt such step as to cast a high polymer solution on, or to fix a thin film onto, a suitable support, unlike in the case of the conventional process for preparing ultrathin membranes.

Another feature of the present process resides in that the water-soluble high polymer or surfactant in the vicinity of the surface of the above-mentioned cast film is crosslinked, taking advantage of the very small penetration depth of a plasma, and then uncrosslinked portions of the film are removed by washing with water to produce an ultrathin membrane on a support composed mainly of a water-insoluble high polymer.

Further, a feature of the membrane obtained by the present process lies in that since the membrane is prepared by crosslinking the water-soluble high polymer or surfactant present chiefly at the surface of the aforesaid film, it is not only high in hydrophilic property but also has a thickness at effective portion of 1 micron or less, preferably 0.1 to 1 micron, so that the membrane can exhibit high water permeability when used in reverse osmosis or the like method.

Another feature of the present membrane lies in that even water-soluble synthetic high polymers, which are higher in resistance to acids, alkalies and bacteria then the conventional cellulose acetate, can be used as starting materials for the preparation thereof.

A further feature of the present membrane lies in that although the conventional cellulose acetate membrane can substantially not be used at about 30° C., the present membrane can be used even at 80° C.

Thus, the membrane according to the present invention can be widely used for separation and concentration of substances by reverse osmosis, ultra-filtration, etc., more precisely for desalination of sea water, treatment of waste water, and concentration of fruit juices, for example. Further, the membrane according to the present invention is high in hydrophilic property, and hence is excellent in steam permeability, as well.

The present invention is illustrated in more detail below with reference to examples, but the invention is not limited to the examples.

EXAMPLE 1

A cast solution, prepared by dissolving 12 g of polyarylsulfone and 8 g of polyethylene glycol (average molecular weight 1,500) in 30 g of dimethylformamide, was cast on a smooth glass plate, and then air-dried as it was at room temperature to obtain a film. This film was placed in such vacuum vessel as shown in the drawing, and the valves 1 and 7 were controlled so that the pressure of ethylene oxide inside the vessel was maintained at 0.1 Torr. Subsequently, an alternating current voltage of 1.5 KV was impressed between the electrodes 3 and 4 by means of the neon transformer 2, and the film was exposed to the generated plasma for 60 minutes to prepare a sample 6. The thus prepared sample 6 was mounted in a continuous reverse osmosis apparatus usually used in a laboratory, and a reverse osmosis experiment was effected for 1 hour under such conditions as a pressure of 50 kg/cm$^2$, a salt concentration of the feed solution of 0.55%, and a feed rate of the feed solution of 270 cc/min. As the result, the flux of permeated water was 5.2 gfd (gallon/square foot/day), and the salt rejection was 95.5%. The salt rejection is defined by the following equation:

Salt rejection (%) = [(Concentration in permeate/Concentration in feed solution)] × 100

EXAMPLE 2

A cast solution, prepared by dissolving 15 g of polyacrylonitrile, 5 g of polyethylene glycol and 5 g of polyethylene glycol monostearate in 75 g of dimethyl sulfoxide, was cast on a smooth glass plate and then air-dried as it was at room temperature to obtain a film. This film was exposed to plasma under the same conditions as in Example 1 to prepare a membrane, which was then subjected to the same reverse osmosis experiment as in Example 1. As a result, the flux of permeated water was 25 gfd, and the salt rejection was 89.5%.

EXAMPLE 3

A cast solution, prepared by dissolving 12 g of cellulose diacetate and 18 g of polyoxyethylene cetyl ether in 70 g of acetone, was cast on a smooth glass plate and then air-dried as it was at room temperature to obtain a film. This film was exposed to plasma under the same conditions as in Example 1 to prepare a membrane, which was then subjected to the same reverse osmosis experiment as in Example 1. As the result, the flux of permeated water was 3.8 gfd, and the salt rejection was 92.4%.

EXAMPLE 4

A cast solution, prepared by dissolving 10 g of polyarylsulfone and 10 g of polyoxyethylene cetyl ether in 30 g of dimethylformamide, was cast on a smooth glass plate and then air-dried as it was at room temperature to obtain film. This film was exposed to plasma under the same conditions as in Example 1, except that the impressed voltage was varied to 3 KV, to prepare a membrane, which was then subjected to the same reverse osmosis experiment as in Example 1. As the result, the flux of permeated water was 10.3 gfd, and the salt rejection was 83.5%.

EXAMPLE 5

A cast solution, prepared by dissolving 12 g of polystyrene and 8 g of polyethylene oxide (average molecular weight 30,000) in 50 g of benzene, was cast on a smooth glass plate and then air-dried as it was at room temperature to obtain a film. This film was exposed to plasma under the same conditions as in Example 4 to prepare a membrane, which was then subjected to the same reverse osmosis experiment as in Example 1. As the result, the flux of permeated water was 30.4 gfd, and the salt rejection was 42.3%.

What is claimed is:

1. A process for preparing a membrane for separation of substances which comprises:
   a. dissolving a water-insoluble high polymer, and a water-soluble high polymer and/or a water-soluble surfactant in a proportion of 0.1 to 3 parts by weight of water-soluble high polymer and/or surfactant with 1 part by weight of the water-insoluble high polymer, in an organic solvent;
   b. casting said solution to form a shaped article;
   c. evaporating said organic solvent;
   d. exposing the thus formed shaped article to a plasma to crosslink the surface; and
   e. subsequently removing uncrosslinked water-soluble high polymer and/or surfactant by washing with water.

2. A process according to claim 1, wherein the water-insoluble high polymer is polysulfone, polyamide, polyester, polyphenylene oxide, polyacrylonitrile, polymethyl methacrylate, polyvinyl chloride, polystryene, polyacetal, cellulose acetate or cellulose nitrate.

3. A process according to claim 2, wherein the water-insoluble high polymer is polysulfone or polyacrylonitrile.

4. A process according to claim 1, wherein the water-soluble high polymer is polyethylene oxide, polyethylene glycol, polyvinylamine, polyacrylamide, polyacrylic acid, polyvinyl pyrrolidone, polyvinyl alcohol or polyethyleneimine.

5. A process according to claim 4, wherein the water-soluble high polymer is polyethylene oxide, polyethylene glycol, polyvinylamine or polyacrylamide.

6. A process according to claim 1, wherein the water-soluble surfactant is an anionic, nonionic, cationic or natural surfactant.

7. A process according to claim 6, wherein the anionic surfactant is sodium oleate, sodium laurylsulfate or sodium polyoxyethylene alkyl sulfate.

8. A process according to claim 6, wherein the nionic surfactant is polyoxyethylene lauryl ether, polyoxyethylene cetyl ether, polyoxyethylene oleyl ether, polyoxyethylene nonylphenyl ether, polyoxyethylene stearyl ether, polyoxyethylene octylphenyl ether, polyoxyethylene sorbitan monolaurate or polyethylene glycol monostearate.

9. A process according to claim 6, wherein the cationic surfactant is laurylamine acetate or laurylmethyl ammonium chloride.

10. A process according to claim 6, wherein the natural surfactant is saponin.

11. A process according to claim 2, wherein the water-soluble surfactant is polyoxyethylene cetyl ether, polyoxethylene oleyl ether, polyoxyethylene nonylphenyl ether or polyethylene glycol monostearate.

12. The process according to claim 1 wherein said organic solvent is selected from the group consisting of dimethyl formamide, dimethyl sulfoxide, acetone, and benzene.

13. A process according to claim 1, wherein the gas used to form the plasma is at least one member selected from the group consisting of helium, argon, nitrogen, hydrogen, oxygen, carbon monoxide, carbon dioxide, hydrocarbons having 1 to 10 carbon atoms, epoxides having 2 to 10 carbon atoms, and alkylamines.

14. A process according to claim 13 wherein the gas used to form the plasma is helium, hydrogen or ethylene oxide.

15. A process according to claim 1, wherein the plasma is formed by glow discharge or corona discharge.

16. A process according to claim 15, wherein the glow discharge is effected at a gas pressure of 0.01 to 10 Torr. and under direct or alternating current voltage of 0.5 to 50 KV.

17. A process according to claim 15, wherein the corona discharge is effected at atmospheric pressure and under a direct current voltage 0.5 to 5 KV.

18. A process according to claim 1, wherein the casting is effected on a flat plate.

19. A process according to claim 1, wherein the casting is effected on a tubular or rod-shaped support.

20. A process according to claim 1, wherein the casting is effected by spinning a hollow filament from the cast solution.

21. A process according to claim 1, wherein the casting is effected by immersing a filamentary fiber in the cast solution, followed by drying.

22. A membrane for separation of substances which is obtained by the process claimed in claim 1.

23. A membrane according to claim 22 which has a thickness of 1 micron or less.

24. A membrane according to claim 23 which is used for separation or concentration of substances by reverse osmosis or ultrafiltration.

* * * * *